United States Patent
Gilliam

[15] 3,645,032
[45] Feb. 29, 1972

[54] LINE CLAMP
[72] Inventor: Joe L. Gilliam, Tampa, Fla.
[73] Assignee: Mary Melvin, Tampa, Fla.
[22] Filed: Oct. 1, 1969
[21] Appl. No.: 862,706

[52] U.S. Cl. ............................................. 43/44.9, 114/218
[51] Int. Cl. ....................................................... A01k 95/00
[58] Field of Search ........................... 43/44.87, 44.9, 44.97

[56] References Cited

UNITED STATES PATENTS

| | | | |
|---|---|---|---|
| 3,104,488 | 9/1963 | Hicks | 43/44.91 X |
| 3,174,249 | 3/1965 | Louden | 43/44.97 X |
| 3,203,133 | 8/1965 | Gilliam | 43/44.9 |

*Primary Examiner*—Samuel Koren
*Assistant Examiner*—Daniel J. Leach
*Attorney*—Stefan M. Stein

[57] ABSTRACT

A line clamp for rapid and easy attachment to the central portion of a fishing line comprising a sinker body formed by an upper segment cantilevered to a lower segment defining a slot therebetween and a bridge integral with the lower segment and overlying the upper segment to provide an opening for passage of the line therethrough. Notches are provided in the bridge at its points of attachment to the lower segment which are aligned with the closed end of the slot. A bight of the line is passed through the opening, engaged in the closed end of the slot, and then straightened to place the line in the bridge notches. The open end of the slot is disposed inside a plane defined by the top of the bridge and a side edge of the lower segment to prevent closure of the slot when the sinker is dropped.

4 Claims, 6 Drawing Figures

Patented Feb. 29, 1972     3,645,032

INVENTOR.
JOE L. GILLIAM
BY
*Stefan M. Stein*
ATTORNEY.

LINE CLAMP

This invention relates to a line clamp; more particularly to a device adaptable for use as either a sinker or belaying post.

In U.S. Pat. No. 3,203,133, incorporated by reference into this application, I show and describe a unique fishing sinker. It essentially consists of a slotted body formed by lower and upper body segments and a steel loop member overlying the upper segment. It is quickly and easily attached to a fishing line by first forming a bight in the line and then passing the bight between the steel loop and the upper segment, and from there into the slot. After being attached, the sinker slides freely on the line while being retained thereto. This gives a fisherman greater sensitivity to a fish-bite than if the sinker were clamped to the line as is conventional. Although the sinker has proven to be marvelously effective, manufacture and usage have revealed several disadvantages which need to be improved upon.

One disadvantage is that when the sinker is dropped, frequently, its upper segment is bent against the lower segment and closes the slot. Afterwards, the line cannot be removed from, nor attached to the sinker.

Another disadvantage is the sinker tends to get caught on fishing line accessories—fishing hooks, leader fasteners, swivels and the like. They tend to wedge between the upper segment and the steel loop member. When this occurs, instead of riding freely on the line, the sinker is effectively clamped to it. The advantage of the sinker in not interfering with the sensitivity of a fish-bite is then eliminated.

Still another disadvantage is that one of the major expenses in fabricating the sinker is the formation, positioning, and installation of the wire loop.

It has also been discovered that the basic structure of the sinker and its ease of attachment lend itself to be effectively utilized as a belaying post or anchoring post, for securing mooring lines for ships, tiedown lines for planes, etc.

Therefore, it is an object of this invention to provide a device that may be easily and quickly attached to or removed from a central portion of a line and utilized as a sinker or belaying post.

Another object is to provide an improved sinker that will not interfere with the sensitivity of a fish-bite.

Still another object is to provide a sinker that is slidable on a fishing line, but will not catch on swivels, leader fasteners, hooks and other fishing line accessories.

A further object is to provide a sinker that is freely slidable on a fishing line and is dynamically balanced such that when the sinker is moved through the water with the line, it will not cause the line to swing or fluctuate.

A still further object is to provide a sinker that is easily attached to a fishing line by passing a bight of the line through a slot in the sinker and that has means to prevent the slot from being closed when the sinker is inadvertently dropped.

Another object is to provide a sinker which is exceptionally practical and economically feasible to manufacture.

Another object is to provide for mooring lines, "tiedown" lines, etc., a belaying post to which a central portion of the line may be easily attached or removed.

Another object is to provide a belaying post which is simple in construction, and practical and economically feasible to manufacture.

Other objects of the invention will in part be obvious and will in part appear hereinafter.

Briefly summarizing the invention, the basic structure essentially consists of a lower body segment, an upper platelike segment cantilevered with respect to the body segment to form a slot therebetween, and a bridge overlaying the upper segment and attached to each end of the lower segment adjacent the fore and aft sidewalls of the upper segment. Where attached, the bridge is notched to define with the closed end of the slot, a linear, line-receiving opening extending along the longitudinal axis of the device.

The device is easily and quickly attached to a line merely by forming a bight in the line, passing the bight first between the bridge and the upper segment and then into the slot. When the line is straightened, it is retained within the line-receiving opening. The device may be removed simply by reversing the above procedure.

Conveniently, the device can be adapted to be effectively utilized as a sinker or belaying post. When utilized as a sinker, it is attached to the fishing line to be freely slidable thereon so as not to interfere with the sensitivity of a fish-bite. Advantageously, the notches in the bridge prevent the sinker from being wedged to or caught by fishing line accessories such as hooks and swivels. The upper surface of the bridge is proportioned with respect to the sidewall of the sinker so that the open end of the slot lies within a plane drawn between the two. This prevents the upper segment from being bent and closing the slot, when the sinker is inadvertently dropped. The sinker is also dynamically balanced with respect to the line such than when the line is drawn through the water, the sinker will rotate uniformly and not cause the fishing line to excessively fluctuate or swing.

When used as a belaying post for mooring lines, etc., the basic structure of the device is modified only by enlarging the lower segment of the device and adapting it for attachment to a solid foundation. The line is prevented from passing through the post by forming a knot or attaching an abutment on its free end.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which.

Similar reference characters refer to similar parts throughout the several views of the drawing.

Figure 2:
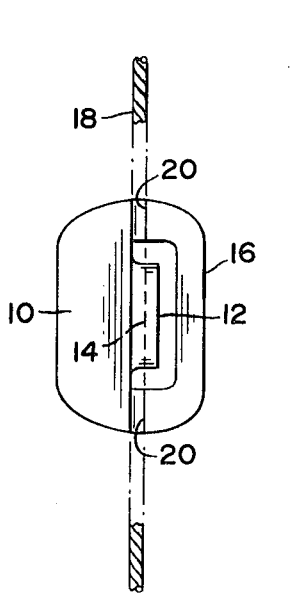
FIG. 2 is a side elevation view taken along lines 2—2 of FIG. 1.
Figure 1:
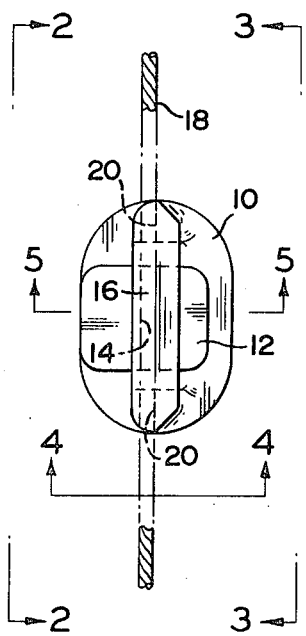
FIG. 1 shows a top view of the device adapted for use as a sinker.
Figure 3:
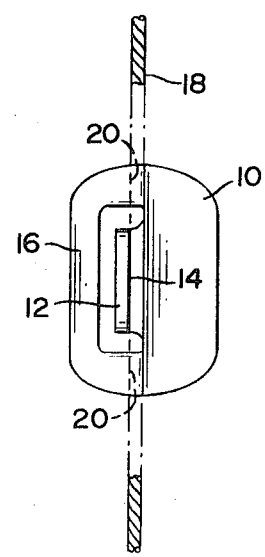
FIG. 3 is a side elevation view taken along lines 3—3 of FIG. 1.
Figure 4:
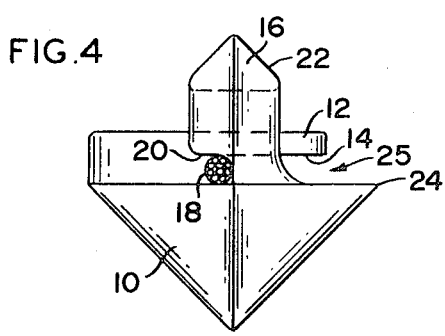
FIG. 4 is an elevation view taken along lines 4—4 of FIG. 1.
Figure 5:
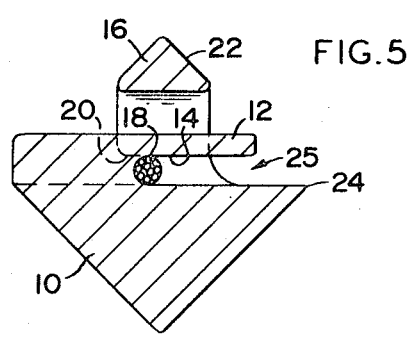
FIG. 5 is a cross-sectional view taken along lines 5—5 of FIG. 1.

Referring now to the figures in detail, there is illustrated in FIGS. 1 through 5 the first embodiment of the invention. In this embodiment, the device is adapted to be utilized as a sinker and will hereafter be designated as such. It is integrally cast from lead and consists of a lower segment or body portion 10; an upper platelike segment 12 cantilevered with respect to the body to form a line-receiving, locking slot 14 therebetween; and a bridge 16 overlaying the upper segment 12 and attached to each end of the body 10 adjacent the sidewalls of the lower segment 10.

The body 10 is substantially V-shaped to facilitate its passage through the water. The height of slot 14 is slightly larger than the diameter of a fishing line 18 to which the sinker is attached. This allows the fishing line to be easily inserted therein but without excessive play between the bottom and top of the slot.

Bridge 16 is cast with notches 20 at its point of attachment to sinker body 10 so as to define in conjunction with the closed end of the slot 14 a linear, line-receiving opening which extends through the sinker body along its longitudinal axis. The notches are also provided to prevent the sinker from being caught or wedged to a hook, sinker, swivel or other similar fishing line accessory. When the sinker contacts either of these accessories, the accessory bears against the substantially flat end of the bridge 16 instead of being wedged and caught between the bridge and upper segment 12.

Bridge 16 also has a configuration to prevent the locking slot from being inadvertently closed when the sinker is dropped. When a plane is drawn between the outer surface 22 of the bridge and the sidewall 24 of the body 10, the open end 25 of upper segment 12 is within this plane. Consequently, if the sinker is inadvertently dropped, even if it lands on its slot side, the upper segment 12 will not be hit and bend such that it will close the locking slot. If the locking slot is closed, as will become obvious, the line can neither be removed nor attached.

The sinker is attached to the fishing line in the following manner. A bight is formed in the line and then passed from left to right, as viewed in FIG. 1, between the bridge and lower segment 12. Afterwards, the bight is lowered into locking slot 14, pulled to the left until it is in contact with the closed end of the slot, and then straightened while placing it within the notches of the bridge 16. At this time, as should be easily understood, the line is slidably retained within the line-receiving opening of the sinker.

The sinker may be removed simply by reversing this procedure.

Importantly, since the sinker tends to rotate in the water, the components of its structure including the upper and lower segments, the passageway, and the position of the bridge are all arranged relative to one another such that the sinker is dynamically balanced with respect to the fishing line. Thus, when the sinker is dragged through the water, as for example, when a lure is being trolled or reeled in, it does not cause the line to excessively swing or fluctuate.

Figure 6:
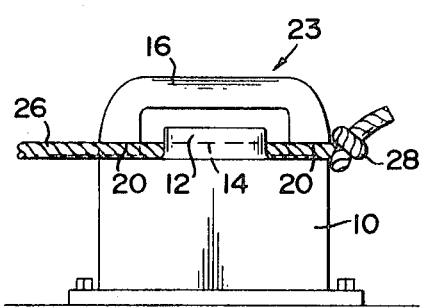
FIG. 6 is a side elevation view of the device adapted for use as a belaying post.

A second embodiment of the invention is shown in FIG. 6. In this embodiment, the device is adapted to be utilized as a belaying post designated 23 for securing mooring lines for ships, "tiedown" lines for planes and the like. The structure of the belaying post is similar to that of the sinker, with a few exceptions. The post is preferably cast of concrete or steel, and its lower segment 10 is enlarged and adapted to be attached to a rigid foundation. Also, it is unnecessary to proportion bridge 16 in a manner to protect the open end of the slot. Axiomatically, unlike the sinker, there is no danger of the slot being closed by dropping the belaying post. It should also be obvious that the dimensions of the belaying post will be considerably larger than the sinker.

A mooring line, "tiedown" line, etc., 26 is attached to the belaying post in a similar manner as that described for the sinker. It is prevented from passing through the post by applying a knot 28 on the free end of the line, as shown, or by placing or securing an abutment thereto.

It should now be obvious from the above description that a device for attachment to a line has been invented. Conveniently, this device can be utilized either as a sinker or as a belaying post. In both instances, the device can be quickly and easily attached to or removed from a central portion of a line, yet securely retained thereto. As a sinker, it freely slides on the line, preferably on the leader, thus enabling a fisherman to have maximum sensitivity to a fish-bite. Further, provision is made to prevent it from being caught on accessories on the fishing line and from being damaged when inadvertently dropped. Also, the sinker is dynamically balanced to prevent it from causing the fishing line to excessively swing when the sinker is moved through the water. When the device is used as a belaying post, it is adapted to be attached to a permanent foundation. A mooring line is prevented from sliding through the post by placing a knot or securing an abutment on the free end of the line. Since the device in both usages can be simply cast in an integral unit, it is exceptionally practical and economically feasible to manufacture.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,

What is claimed is:

1. A device for attachment to a line comprising a fishing line sinker having a lower segment, an upper segment cantilevered to said lower segment to define a longitudinal line-receiving slot therebetween, said slot having a height slightly larger than the thickness of the line and having a depth that extends into the interior portion of the device thus formed, an integral bridge affixed to the lower segment adjacent to and spaced from the sides of the slot, said bridge overlying the upper segment to define an opening to pass the line therethrough, a top portion of said bridge being positioned above the said slot and in cooperative aligned relation to a side edge portion of said lower segment located adjacent to the open end of said slot, the open end of the slot being inside a plane defined by said top bridge portion and said side edge portion to prevent said slot from being closed when the device is dropped.

2. The device of claim 1 wherein said bridge is notched to define with the closed end of the slot the linear line-receiving open-ended passageway through the body.

3. The device of claim 1 wherein said upper segment, said lower segment, and said bridge are all arranged relative to one another to provide dynamic balancing of the device with respect to the line, whereby excessive fluctuation of the line is prevented when the device is dragged through water.

4. The device of claim 2 wherein said upper segment, said lower segment and said bridge are all relatively arranged to one another so as to provide dynamic balancing of the device with respect to the line, whereby excessive fluctuation of the line is presented when the device is dragged through water.

* * * * *